(No Model.)
C. A. DIETZ.
ORANGE KNIFE.
No. 509,515. Patented Nov. 28, 1893.
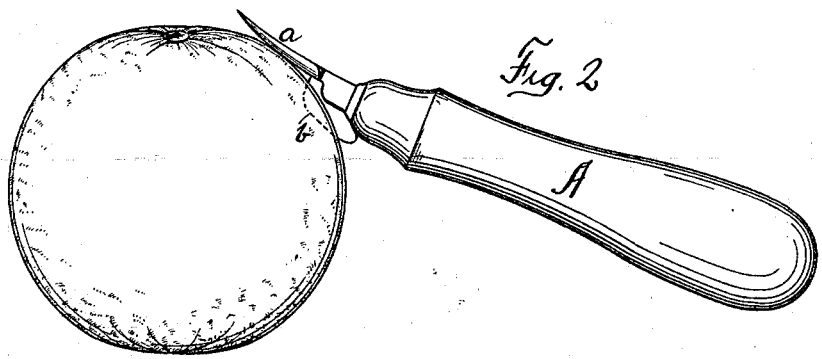
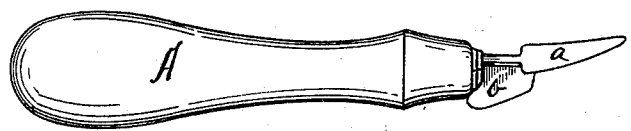
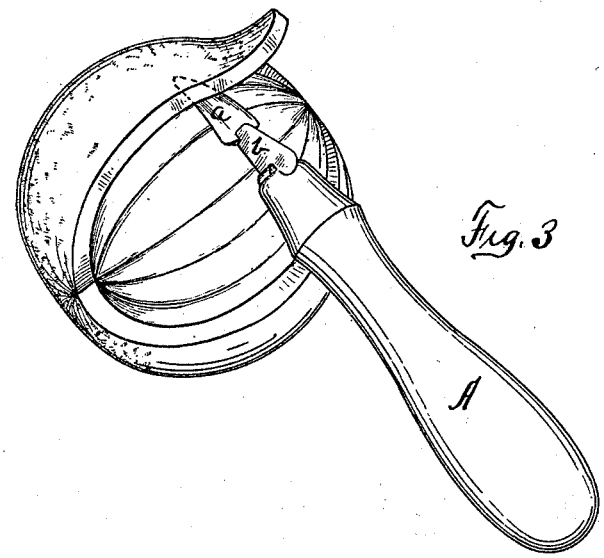
WITNESSES:
H. A. Carhart.
D. May Goodrich.
INVENTOR
Chas. A. Dietz
By Smith & Denison
ATTORNEYS.

UNITED STATES PATENT OFFICE.

CHARLES A. DIETZ, OF DANVILLE, PENNSYLVANIA.

ORANGE-KNIFE.

SPECIFICATION forming part of Letters Patent No. 509,515, dated November 28, 1893.

Application filed April 26, 1893. Serial No. 471,870. (No model.)

*To all whom it may concern:*

Be it known that I, CHARLES A. DIETZ, of Danville, in the county of Montour, in the State of Pennsylvania, have invented new and useful Improvements in Orange-Knives, of which the following, taken in connection with the accompanying drawings, is a full, clear, and exact description.

My invention relates to orange knives, which are adapted to cut the skin and sever the same from the pulp surface thereof.

My object is to produce such a knife, although it will be very evident that it can be used with equal facility upon any piece of fruit having a similar skin, which tenaciously adheres to the exterior surface of the pulp; cheap and durable in its construction, efficacious in its operation and of great utility.

My invention consists in the several novel features of construction and operation hereinafter described and which are specifically set forth in the claim hereunto annexed.

It is constructed as follows, reference being had to the accompanying drawings, in which—

Figure 1, is a view of the knife complete. Fig. 2, is a view of the knife in the act of cutting transversely the peel, it being assumed that the orange is held in the left hand and the knife in the right hand. Fig. 3, is a view of the knife, as it appears in use, in the act of severing the peel from the pulp surface.

A, is the handle; and —a— is the loosening blade constructed preferably as shown, reduced in size at its forward end and having its faces concave and convex, respectively.

b, is a cutting blade secured at substantially right-angles to the blade —a—, having said cutting edge inclined slightly forward, as shown, and located between the front end of the handle and the rear end of the loosening blade —a—. It will be observed that by taking the orange in the left hand and the knife in the right-hand, the lower face of the blade —a— will be placed upon the face of the orange to serve as a guide and keep the blade —b— from cutting below the lower edge of the rind. Then the knife is reversed and the loosening blade is slid along under the rind, as shown in Fig. 3, for the purpose of severing it from the pulp surface.

What I claim as my invention, and desire to secure by Letters Patent, is—

An orange knife comprising a concavo-convex loosening blade, having its forward end reduced in size, its edges sharpened, a cutting blade secured between the handle and loosening blade at substantially right angles thereto, and having its edge inclined forwardly.

In witness whereof I have hereunto set my hand this 22d day of April, 1893.

CHARLES A. DIETZ.

In presence of—
CHAS. P. HARDER,
WM. DIETZ.